United States Patent [19]

Castle et al.

[11] Patent Number: 5,423,129
[45] Date of Patent: Jun. 13, 1995

[54] DESICCANT CARTRIDGE OF AN AIR DRYER

[75] Inventors: T. Kevin Castle; Michael V. Kazakis, both of Greenville, S.C.

[73] Assignee: Westinghouse Air Brake Company, Wilmerding, Pa.

[21] Appl. No.: 992,319

[22] Filed: Dec. 21, 1992

[51] Int. Cl.⁶ .............................................. F26B 21/06
[52] U.S. Cl. ............................................ 34/80; 34/82; 34/300; 62/94
[58] Field of Search ................ 34/300, 69, 71, 72, 34/74, 76–82, 95, 9, 27, 32, 294, 299, 329, 332, 345, 472; 55/281, 390; 62/94

[56] References Cited

U.S. PATENT DOCUMENTS

| | | | |
|---|---|---|---|
| 2,388,134 | 10/1945 | Flosdorf et al. | 34/299 |
| 3,446,031 | 5/1969 | Chi et al. | 62/94 |
| 4,180,985 | 1/1980 | Northrup, Jr. | 62/94 |
| 4,385,450 | 5/1983 | Thomas et al. | 34/104 |

Primary Examiner—Denise L. Gromada
Attorney, Agent, or Firm—John B. Sotak

[57] ABSTRACT

A desiccant cartridge for use in a compressed air system comprising, a perforated stainless steel casing, a polyester felt support liner disposed against the inner surfaces of the perforated stainless steel casing, a pelletized moisture-absorbing material situated within the polyester felt support liner, and a pair of rubber cup-shaped end caps molded to the ends of perforated stainless steel case so that moisture vapor is extracted from compressed air passing radially the desiccant cartridge.

16 Claims, 2 Drawing Sheets

DESICCANT CARTRIDGE OF AN AIR DRYER

FIELD OF THE INVENTION

This invention relates to an air drying element for use in a compressed air system and, more particularly, to a moisture-absorbent desiccant cartridge including a stainless steel shell having an inner and an outer perforated cylindrical wall, a layer of porous polyester filter media disposed adjacent the inside of the inner and outer perforated cylindrical walls, a bed of pelletized molecular sieve desiccant contained between the layers of the porous polyester filter media, and a rubber end cap covering the respective ends of the stainless steel shell so that moisture is effectively removed from compressed air passing radially through the desiccant cartridge.

BACKGROUND OF THE INVENTION

It will be appreciated that a Westinghouse Air Brake Company C-1 air dryer is designed so that it removes moisture vapor for the compressed air passing through it. In practice, the C-1 air dryer employs a single tower moisture removal, cleansing and regenerating system containing a desiccant material to absorb moisture from the air. That is, as the compressed air passes through the desiccant, the moisture is absorbed by the drying agent and retained until the compressor stops operating, and then dry, regenerative air passes back through the desiccant and picks up the collected moisture and discharges it to the atmosphere. Previously, the air drying function was performed by a preshaped stone-type cylinder of calcium chloride (CaCl4) desiccant material. The pressed desiccant hollow cylinder was placed in the C-1 air dryer and was sealed on each end by a separate annular rubber gasket. While this preformed cylindrical block desiccant removed moisture from the compressed air, it had a number of shortcomings or disadvantages. First, the preshaped porous desiccant cylindrical block has a relatively small surface area so that it had a limited moisture-collection capability. Second, the desiccant block had a tendency to disintegrate into a fine grit while in service which could result in the contamination of the compressed air system. That is, the introduction of grit into the air stream could be detrimental and adversely affect the operation of various components of the air brake system. Third, the pressed desiccant material is relatively fragile and could not sustain rough handling and could only endure moderate compressive loads without breaking up into a number of separate pieces. Once the desiccant breaks up, its moisture-absorbing qualities are substantially impaired and are effectively destroyed.

OBJECTS AND SUMMARY OF THE INVENTION

Accordingly, it is an object of this invention to provide a new and improved desiccant cartridge for use in a compressed air system.

Another object of this invention is to provide a unique air drying element which effectively removes moisture and dirt in an air brake system.

A further object of this invention is to provide an air dryer and filter member including a perforated hollow cylindrical shell, a felt media, and a pelletized molecular sieve desiccant contained therein for use in compressed air system.

Still another object of this invention is to provide a moisture absorbing cartridge having an inner pelletized hydrated alumina desiccant material, an intermediate polyester felt filtering media, and an outer apertured stainless steel cylinder container which is capped by annular rubber end caps.

Still a further object of this invention is to provide an air drying element for use in a compressed air system comprising, a perforated shell member, a porous filter media conforming to the inner boundaries of the perforated shell member, and pelletized desiccant material disposed within the porous filter media, and a pair of cap members sealing the ends of said perforated shell member wherein moisture is absorbed by the pelletized desiccant material from the air passing through the air drying element.

Yet another object of this invention is to provide a desiccant cartridge for an air dryer comprising, a casing having an inner cylindrical apertured wall and an outer cylindrical apertured wall, a filter liner situated adjacent the inner surfaces of the inner and outer cylindrical apertured walls of the casing, a pelletized moisture absorbing material disposed between the filter liner of said inner and outer surfaces of the inner and outer cylindrical apertured walls of said casing, and an end cap covering the respective ends of the casing whereby the incoming air passes through the outer and inner cylindrical apertured walls, said filter liner, and the pelletized moisture absorbing material to exsiccate moisture contained therein.

Yet another object of this invention is to provide an improved desiccant cartridge which is simple in construction, efficient in operation, economical in cost, reliable in use, durable in service, and easy to install.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
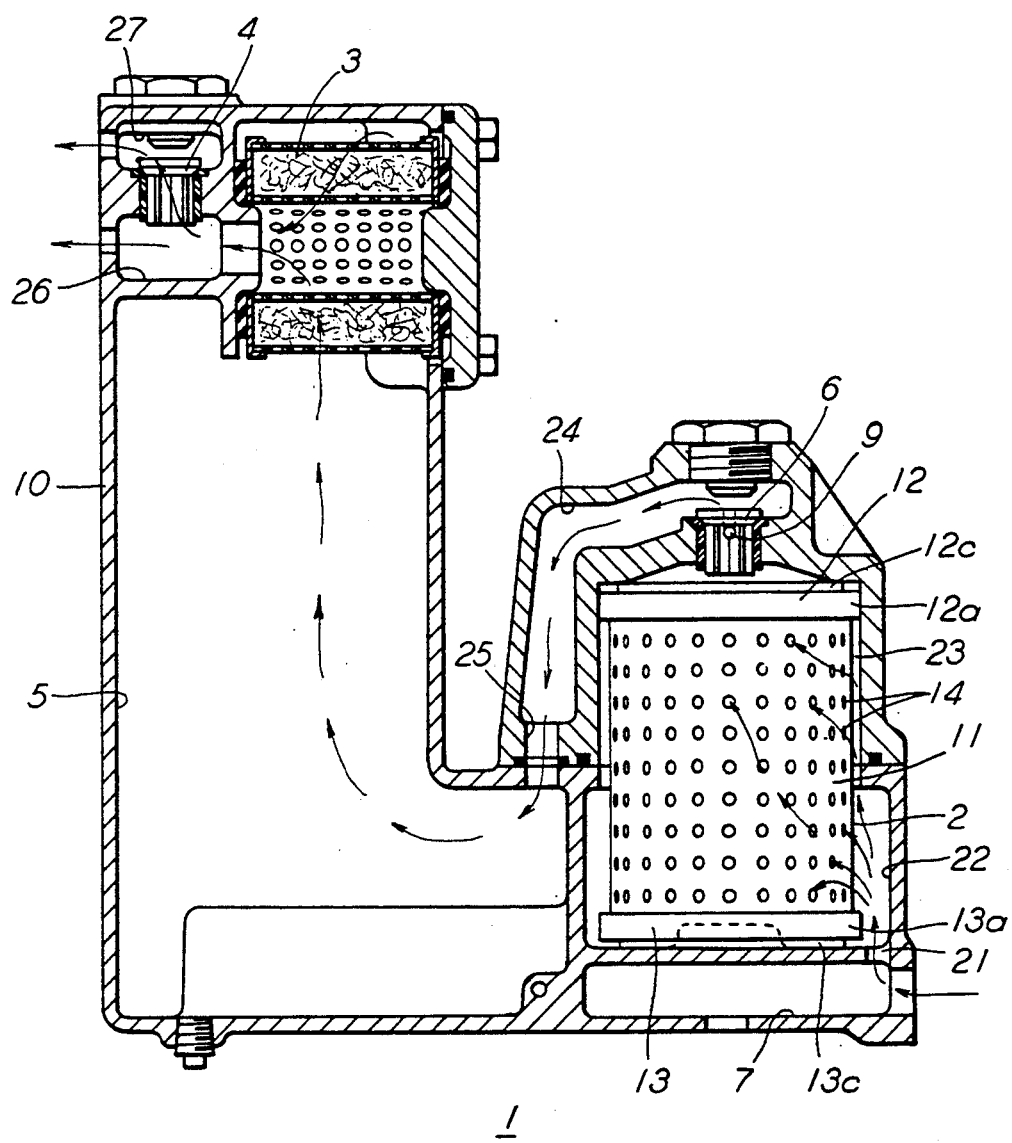
FIG. 1 is a side elevational view, partly in section, of an air dryer apparatus employing the desiccant cartridge of the present invention.

Referring now to the drawings, and in particular to FIG. 1, there is shown a cross-sectional view of a C-1 type of air dryer 1 which consists of a single tower containing the desiccant cartridge or dryer element 2 in accordance with the present invention. The C-1 air dryer also includes a discharge air filter element 3, a discharge check valve 4, a purge volume 5, a purge check valve 6 with a choke, and a sump volume 7. The following is a brief explanation of the various parts of the C-1 air dryer 1. As shown and as will be explained in greater detail hereinafter, the dryer element 2 is a hollow radial flow, cylindrical-shaped cartridge member which functions to remove moisture or water vapor from compressed air passing through it. The purge volume 5 is capable of holding approximately five-hundred cubic inches (500 in³) of compressed dry air. In practice, when the air compressor is in an "OFF" condition, the stored compressed dry air contained by the purge volume 5 is permitted to slowly pass through the choke of the check valve 6 and through the desiccant cartridge 2 in the reverse direction so that collected moisture is exhausted to atmosphere. Accordingly, the desiccant cartridge 2 is rejuvenated since the entrapped moisture is removed and is purged to the atmosphere so that the cartridge 2 is effectively dried and is ready to remove moisture for the incoming compressed air when the compressor is again in its "ON" cycle. The discharge air filter 3 is preferably integrally housed within the casing 10 of the dryer 1 as a precautionary measure to prevent the possibility of drying element deterioration or erosion. If proper maintenance is observed and practiced for the dryer 1, the probability of dry element erosion is highly unlikely to occur. The discharge check valve 4 is incorporated in the air dryer 1 in order to prevent back flow of air from the main reservoir during the purge cycle. As shown, the purge check valve 6 includes a choke 9 which permits unrestricted flow of compressed air during the compressor "ON" cycle and which controls the rate of the flow of air from the purge volume 5 during the compressor "OFF" cycle.

Figure 2:
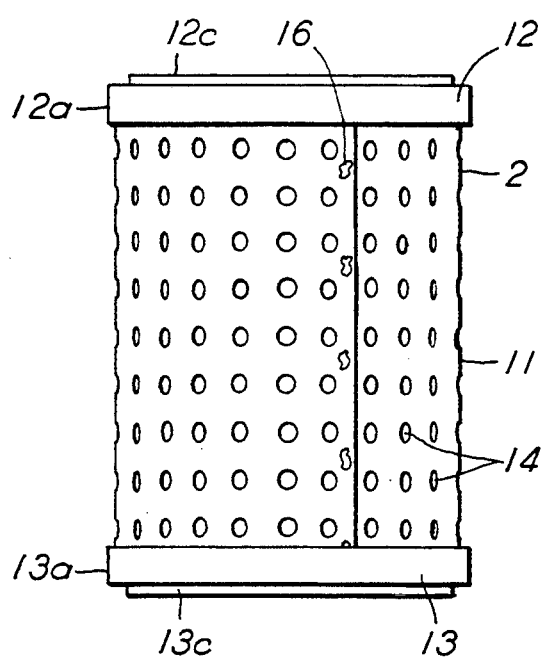
FIG. 2 is a slightly enlarged view of the desiccant cartridge or air drying element in accordance with the present invention.
Figure 3:
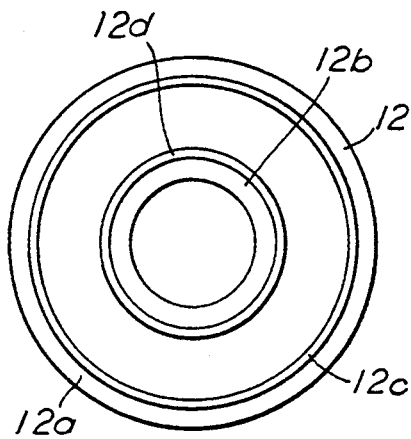
FIG. 3 is a top plan view of the desiccant cartridge of FIG. 2.

Referring now to FIG. 2, it will be seen that the dryer element or desiccant cartridge 2 is shown in greater detail in this slightly enlarged view.

As shown in FIG. 2, the air drying element or desiccant cartridge 2 includes outer perforated cylindrical shell or exterior apertured jacket 11 which is capped by a pair of annular end sealing caps or members 12 and 13. In practice, the perforated outer shell 11 is preferably constructed of stainless steel, however, it will be appreciated that other corrosion-resistant metals or plastics may be used. Initially, the outer shell may be a flat piece of stainless steel metal which is punched or perforated with a plurality of openings or holes 14 and then formed into a cylinder in which the contiguous edges are pinched, welded or the like, as illustrated by welded seam 16.

Figure 4:
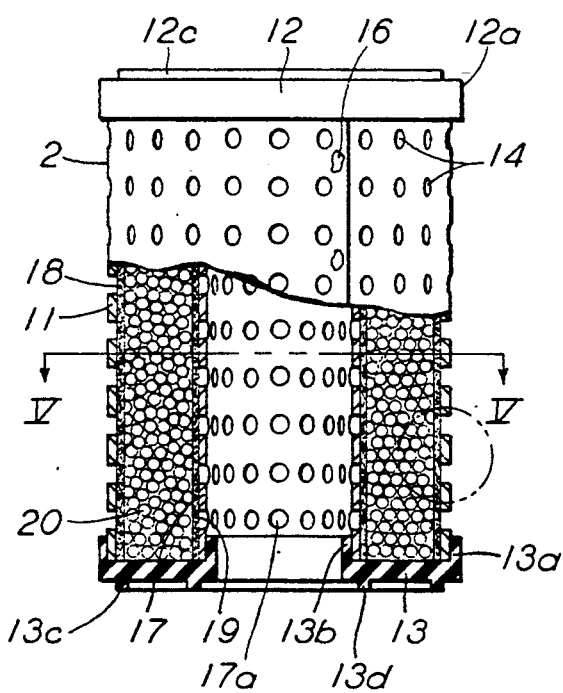
FIG. 4 is a partial cross-sectional view of the desiccant cartridge.
Figure 5:
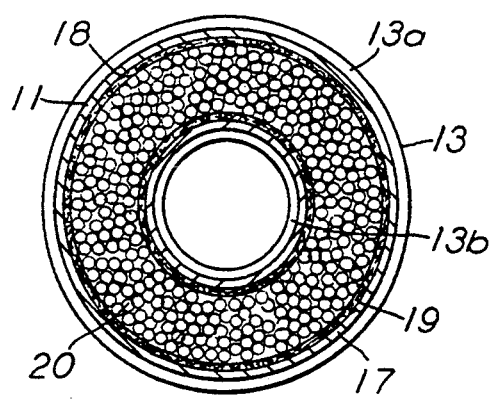
FIG. 5 is a cross-sectional view taken along line V—V of FIG. 4.
Figure 4A:
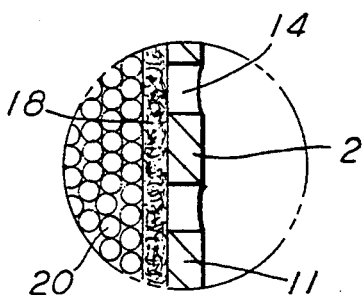
FIG. 4a is a magnified view of stainless steel sheet, the felt liner, and the desiccant of the cartridge of FIG. 4.

In viewing FIGS. 2, 3, 4, and 5, it will be noted that the annular rubber end caps 12 and 13 are cup-shaped members having two flanges or rims 12a, 12b and 13a, 13b, respectively. The outer flanges 12a and 13a of end caps 12 and 13 are molded to the exterior upper and lower ends of the outer perforated shell 11. As shown in FIGS. 4 and 5, the air drying element 2 includes an inner perforated cylindrical shell or interior apertured jacket 17 which is also constructed of stainless steel or some other corrosion-resistant material. The inner shell 17 may be made in the same way as the outer shell 11. It will be noted that the interior upper and lower ends of the inner shell are molded to the inner flanges 12b and 13b of rubber end caps 12 and 13, respectively.

It will be seen in FIGS. 2, 3, 4, and 5, that the outer surfaces of the rubber end caps 12 and 13 are provided with outer annular beads 12c and 13c, respectively, and are also provided with inner annular beads 12d and 13d, respectively.

During the assemblage of the desiccant cartridge, the bottom end cap 13 is initially molded to the lower ends of apertured shells 11 and 17. After the initial molding, a four micron (4μ) polyester felt support media or liner 18 is placed against the inner surface of the outer perforated cylindrical shell 11, and a similar polyester felt liner 19 is situated around the inside of the inner perforated cylindrical shell 17. After the lining material is positioned along the inner walls of the cylindrical shells 11 and 17, a loose desiccant material 20 is packed in the opening between the two felt liners 18 and 19. The desiccant material filling the space is approximately two and one-half pounds (2.5 lbs.) in weight and is made up of approximately three sixteens inch (3/16") of beads or spheres of activated or hydrated alumina. After the desiccant 20 is full-packed, the cartridge 2 is sealed by placing and molding the top rubber end cap 12 to the upper ends of the outer and inner shell members 11 and 17. The alumina desiccant 20 absorbs the moisture or water vapor in the compressed air passing radial through the cartridge 2. The liners 18 and 18 have a dual function, namely, filtering dust and dirt from the entering compressed air and purging air as well as retaining and preventing any grit or dusting desiccant material from entering air brake system. The perforated stainless steel shell 11,17 provides substantial physical strength to the desiccant cartridge so that it can withstand rough handling and is capable of enduring a substantial amount of compressive forces without collapsing and rupturing. Further, the rubber end caps 12 and 13 not only seal the ends of the desiccant cartridge 2, but also the annular beads 12c, 12d, 13c and 13d function as sealing gaskets to appropriately direct the air through the desiccant cartridge.

As shown in FIG. 1, the compressed air entering chamber 7 passes through opening 21 into chamber 22, through passageway 23, radially through the desiccant cartridge 2, through the unseated check valve 6, through chamber 24, through opening 25 into purge chamber 5, through air filter 3, into chamber 26 which is connected to a valve supply valve (not shown) through the unseated check valve 4, and, in turn, to chamber 27 which is connected to a suitable storage reservoir (not shown) and also to a governor device (not shown). When the compressor is shut "OFF" the check valve 4 is seated to prevent the loss of compressed air in the storage reservoir, and the dry compressed air in purge chamber 5 slowly flows through the choke 9 in check valve 6 to rejuvenate and regenerate the desiccant material 20 for the next ON cycle.

It will be understood that various alterations and changes may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate output. Therefore, it will be appreciated that certain modifications, ramifications, and equivalents will be readily apparent to persons skilled in the art, and accordingly, it is understood that the present invention should not be limited to the exact embodiment shown and described, but should be accorded the full scope and protection of the appended claims.

What we claim is:

1. An air drying element for use in a compressed air system comprising, a perforated shell member, a porous filter media conforming to the inner boundaries of said perforated shell member, said porous filter media is a polyester felt material, a pelletized desiccant material disposed within said porous filter media, and a pair of cap members sealing the ends of said perforated shell member whereby moisture is absorbed by said pelletized desiccant material from the air passing through the air drying element.

2. The air drying element for use in a compressed air system as defined in claim 1, wherein said porous felt material having a capability of filtering particles of approximately four microns in size.

3. The air drying element for use in a compressed air system as defined in claim 1, wherein said pelletized desiccant material is hydrated alumina.

4. The air drying element for use in a compressed air system as defined in claim 1, wherein said pelletized desiccant material is formed by a bed of beads each normally having a diameter of approximately three sixteenth of an inch.

5. The air drying element for use in a compressed air system as defined in claim 1, wherein said pelletized desiccant material provides an active moisture absorbing surface area of approximately five million square feet.

6. The air drying element for use in a compressed air system as defined in claim 1, wherein said pair of cap members are formed of pliable material.

7. The air drying element for use in a compressed air system as defined in claim 6, wherein said pliable material is rubber.

8. The air drying element for use in a compressed air system as defined in claim 1, wherein each of said pair of cap members is molded to the respective ends of said perforated shell member.

9. The air drying element for use in a compressed air system as defined in claim 1, wherein said porous filter media is capable of capturing dirt and other foreign particles in the passing air.

10. A desiccant cartridge for an air dryer comprising, a casing having an inner cylindrical apertured wall and an outer cylindrical apertured wall, a filter liner situated adjacent the inner surfaces of said inner and outer cylindrical apertured walls of said casing, a pelletized moisture absorbing material disposed between said filter liner of said inner and outer surfaces of said inner and outer cylindrical apertured walls of said casing, and an end cap covering the respective ends of said casing whereby the incoming air passes through said outer and inner cylindrical apertured walls, said filter liner and said pelletized moisture absorbing material to exsiccate moisture contained therein.

11. The desiccant cartridge for an air dryer as defined in claim 10, wherein said casing is made of corrosion-resistant material.

12. The desiccant material for an air dryer as defined in claim 11, wherein said corrosion-resistant material is stainless steel.

13. The desiccant cartridge for an air dryer as defined in claim 10, wherein said filter liner is a polyester felt material.

14. The desiccant cartridge for an air dryer as defined in claim 10, wherein said pelletized moisture absorbing material is made of hydrated alumina beads.

15. The desiccant cartridge for an air dryer as defined in claim 10, wherein each of said end caps is a rubber annular member molded to said respective ends of said casing.

16. The desiccant cartridge for an air dryer as defined in claim 15, wherein each of said rubber disk members is an annular gasket.

* * * * *